United States Patent [19]

Iwakura et al.

[11] 4,001,384
[45] Jan. 4, 1977

[54] PROCESS FOR RECOVERY OF OXIDES OF SULFUR FROM COMBUSTION WASTE GAS

[75] Inventors: Junji Iwakura, Amagasaki; Kimihiko Sato, Yokohama; Hisashi Fujii, Amagasaki; Yoshihiro Hashimoto, Daito; Shigeo Ono, Yokohama; Shozaburo Watanabe, Amagasaki; Akio Yokoyama, Nishinomiya, all of Japan

[73] Assignee: Asahi Glass Company, Ltd., Tokyo, Japan

[22] Filed: May 29, 1973

[21] Appl. No.: 364,416

[30] Foreign Application Priority Data

Aug. 1, 1972 Japan .............................. 47-76474

[52] U.S. Cl. .............................. 423/551; 423/242; 423/244
[51] Int. Cl.$^2$ ..................... C01D 5/00; C01B 17/60
[58] Field of Search ................. 423/242, 551, 244; 23/259.6

[56] References Cited

UNITED STATES PATENTS

| | | | |
|---|---|---|---|
| 2,813,000 | 11/1957 | Quittenton | 423/242 |
| 2,843,217 | 7/1958 | Linde | 423/242 |
| 3,745,751 | 7/1973 | Zey et al. | 423/242 |
| 3,781,407 | 12/1973 | Kamijo et al. | 423/242 |

OTHER PUBLICATIONS

Perry: *Chemical Engineers' Handbook*, Third Edition, McGraw–Hill Book Company, Inc., New York, 1950, pp. 1016, 1021, 1022, 1025, and 1029–1030.

*Primary Examiner*—Oscar R. Vertiz
*Assistant Examiner*—Gary P. Straub
*Attorney, Agent, or Firm*—Oblon, Fisher, Spivak, McClelland & Maier

[57] ABSTRACT

A process for the recovery of oxides of sulfur from combustion waste gases, which comprises cooling said waste gases and forming entrained particles of sodium compounds, consisting essentially of sodium carbonate, by spray contact with sodium hydroxide or sodium carbonate, converting sodium carbonate in the particles to sodium sulfate by passing said oxides of sulphur containing waste gases and said sodium compound particles over plate-like packings, whereby said particles are comminuted to a finer particle size form so as to enhance the reaction of said sulfate particles with the oxides of sulfur in said waste gases, collecting entrained particles of said sodium compounds in a dust collector.

8 Claims, 4 Drawing Figures

PROCESS FOR RECOVERY OF OXIDES OF SULFUR FROM COMBUSTION WASTE GAS

BACKGROUND OF THE INVENTION

1. Field of the Invention

This invention relates to a process for the recovery of oxides of sulfur such as $SO_2$ or $SO_3$ from combustion waste gases.

2. Description of the Prior Art

The waste gas issuing from glass melting furnaces usually contains various oxides of sulfur which are mainly produced by the combustion of sulfur in fuel oils such as heavy oil, and dust consisting substantially of sodium sulfate ($Na_2SO_4$) which is vaporized by the high temperature molten glass in the glass melting furnace. Heretofore, it has been difficult to remove the oxides of sulfur and the associated particles from the waste gases. Thus, the presence of these components in waste gases results in the appearance of characteristic white smoke which issues from the stacks of glass manufacturing process. Recently, because of the enactment of antipollution measures which control the pollution levels of air, it has become of utmost importance for glass manufacturers to remove the smog producing components of $SO_2$, $SO_3$ and $Na_2SO_4$ from waste gases.

Various processes for the recovery of oxides of sulfur from combustion waste gases have been proposed. Most of these processes are wet processes wherein the waste gas is contacted with an absorbing solution containing an alkaline absorbent such as sodium hydroxide, sodium carbonate or sodium sulfite. The oxides of sulfur are absorbed in the absorbing solutions and are recovered in the form of sodium sulfite, sodium sulfate or sulfuric acid.

However, in the wet processes, the waste gas is cooled upon contact with the absorbing solution. Accordingly, it has been necessary to heat the waste gas again before venting the treated waste gases through the stack to the atmosphere. The absorbing solution which contains the absorbed sulfur components is usually too dilute to recover the sulfur components. A need therefore, exists for a process which effectively removes the oxides of sulfur and sodium sulfate from waste gases which avoids the difficulties of the conventional wet process.

SUMMARY OF THE INVENTION

Accordingly, one object of this invention is to provide a process for the recovery of oxides of sulfur from combustion waste gases without the disadvantages of conventional wet processes.

Another object of this invention is to provide a process for the recovery of oxides of sulfur from the waste gas of glass melting furnaces in the form of sodium sulfate which is useful as a glass raw material.

Briefly, these objects and other objects of this invention as hereinafter will become readily apparent can be attained by providing a process for the recovery of sulfur from combustion waste gases which comprises a step for cooling the waste gas wherein particles of a mixture of sodium compounds are formed which consist essentially of sodium carbonate by feeding the combustion waste gas to a cooling tower where said waste gas is contacted with a liquid spray of a solution of sodium hydroxide or sodium carbonate in the tower, a step for converting the mixed sodium compound particles to sodium sulfate by contacting the particles with the cooled waste gas in a reaction chamber containing plate-like packings which function to crush the particles when they impinge on the packings thereby exposing fresh surfaces on the particles to react with oxide of sulfur in the waste gas, and collecting the particles in a dust collector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
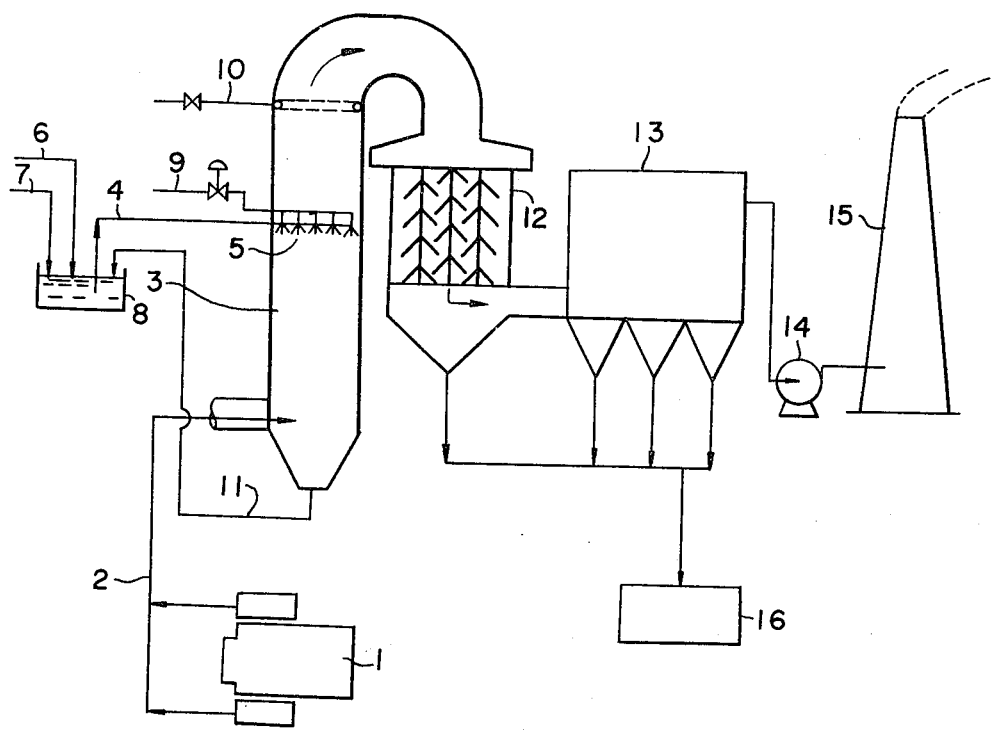
FIG. 1 is a flow diagram of one embodiment of this invention wherein a cooling tower, a reaction chamber and a collector for recovering oxides of sulfur from the waste gas of a glass melting furnace is shown.

With reference to the drawings, especially the flow diagram of FIG. 1 which is one embodiment of this invention the invention is described in detail.

In a glass melting furnace 1, the glass raw materials of sand, sodium carbonate, calcium carbonate, sodium sulfate, and the like and, if necessary, cullet glass are fed into the furnace, wherein heavy oil is burned by a burner positioned on the wall of the furnace. The flame of the burner heats the surface and the crown of the molten glass, whereby the glass raw materials are melted by the radiant heat and the conductive heat to form the molten glass. Sodium sulfate is added to the furnace to refine the molten glass in order to remove bubbles. However, portions of the sodium sulfate are easily carried by gas flow in the furnace, and a portion of the $Na_2O$ in the molten glass is vaporized at the high temperature of the furnace and reacts with $SO_3$ in the gas in the low temperature portion of the flue to form fine particles of $Na_2SO_4$. Usually, the waste gas generated contains $SO_2$ and $SO_3$ which are formed by the decomposition of sodium sulfate and by the combustion of sulfur in the fuel heavy oil, dust particles of $Na_2SO_4$ and flying debris and soot. Most of the $SO_3$ contained in the waste gas is disssolved in water and a mist of sulfuric acid is formed. The waste gas 2 discharged from the glass melting furnace 1 is fed into the lower region of the cooling tower 3 wherein an aqueous solution 4 containing sodium hydroxide or sodium carbonate is sprayed over the waste gas in a countercurrent fashion from spray nozzles placed in the upper regions of the tower. The aqueous solution 4 is prepared by mixing water 6 and sodium hydroxide or sodium carbonate 7 at a predetermined rate in a tank 8. In order to form a spray of the aqueous solution 4, pressurized air or steam 9 forces the aqueous extracting solution through the nozzles to generate spray 6. Wash water 10 is supplied to the upper inner wall of the cooling tower in order to wash and remove the particles of the sodium compounds which adhere to the walls of the tower. The particles flow down the tower and the accumulated particles at the bottom of the cooling tower are dissolved in water and returned through pipe 11 to the tank 8.

The waste gas which initially has a temperature of 400° – 600° C is cooled to 200° – 350° C, preferably 230° – 300° C by contact with the spray of an aqueous solution of sodium hydroxide or sodium carbonate. Simultaneously, particles of a mixture of sodium compounds consisting mainly of sodium carbonate are formed.

When the sodium hydroxide solution is sprayed in the tower, water is vaporized and simultaneously, sodium hydroxide reacts with carbon dioxide which is usually present in the waste gas in a range of 4 – 10% by volume. This reaction forms particles consisting essentially of sodium carbonate and a small amount of unreacted sodium hydroxide. On the other hand, if the sodium carbonate solution is sprayed, particles consisting of sodium carbonate are directly formed. The particles of an alkaline sodium compound or mixture of sodium compounds produced are very porous and chemically active and absorb the oxides of sulfur such as $SO_2$ and $SO_3$ in the waste gas to form sodium sulfate in accordance with the following equations. The sodium compound particles prepared when sodium hydroxide is sprayed have an especially high chemical activity.

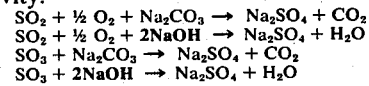

When the sodium hydroxide or sodium carbonate solution is sprayed, spray droplets are preferably formed which have an average diameter of up to 100 $\mu$ preferably 20 – 50 $\mu$ in order to quickly dry the solution. In order to form a suitable spray of the alkaline sodium, pressurized air or steam forces the solution through the nozzles. The concentration range of sodium hydroxide or sodium carbonate in the solution is from 1 – 20 wt.%, preferably 3 – 8 wt.%. The amount of sodium hydroxide or sodium carbonate which is sprayed over the waste gas is dependent upon the concentration of oxides of sulfur in the waste gas and the desired desulfurization rate. Suitable ratios of the sodium hydroxide or sodium carbonate feed to the oxides of sulfur in order to supply an equivalent amount of base range from 0.9 to 1.5, preferably 1.0 to 1.2.

Most of the particles consisting essentially of sodium carbonate which are formed by spraying alkaline solution have particle diameter ranging from 1 – 40 $\mu$. The particles directly react with $SO_3$ and $SO_2$ in the waste gas via the oxidation reactions shown in the equations. The rates of these reactions are very high, however, the reactions stop at a certain stage. The reason that the reaction stops at a certain stage is that the oxidation of $SO_2$ occurs on the surface of the particles of the particular base used while the interior regions of the base particles remain inexposed and therefore do not react with the $SO_2$ its phenomenon is observed in certain gas-solid reactions. About 40 – 50 wt.% of the total amount of alkaline compound sprayed in the cooling tower over the waste gas reacts with the oxides of sulfur in the waste gas to form sodium sulfate. The remaining unreacted quantity of sodium compound is fed to the reaction chamber. A thin layer or skin of sodium sulfate forms over the particles of the sodium compounds discharged from the cooling tower which prevents further reaction of the alkaline compounds with the oxides of sulfur. The coated sodium compound particles are fed to the reaction chamber 12 together with the waste gas. When the spray in the cooling tower 3 is continuously operated for a long period, a scale of sodium carbonate and sodium sulfate adheres around the nozzles at the top of the spray which eventually intercepts the normal flow of spary. In order to prevent scale formation, the temperature of the nozzles is maintained at a temperature lower than the dew point of the surrounding atmosphere which is usually about 30° – 50° C, by providing a cooling means around the nozzle. In one practical embodiment, a water cooling jacket is placed over each nozzle. In another embodiment, when two-fluid systems are employed in the spray, i.e., when the aqueous solution is sprayed under pressure of a gas, is fed to the nozzle through an inner pipe and a cooled aqueous solution is fed to the nozzles through an outer pipe which surrounds the inner pipe.

Reaction Step

Figure 2:
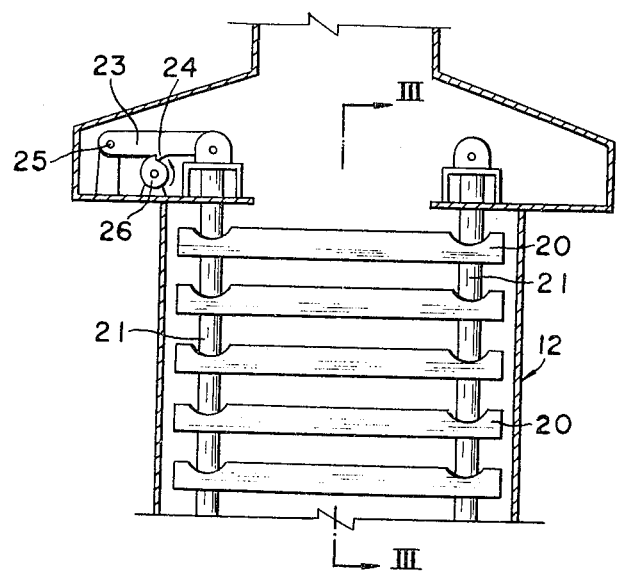
FIG. 2 is a sectional view of the reaction chamber packed with angle bars.
Figure 3:
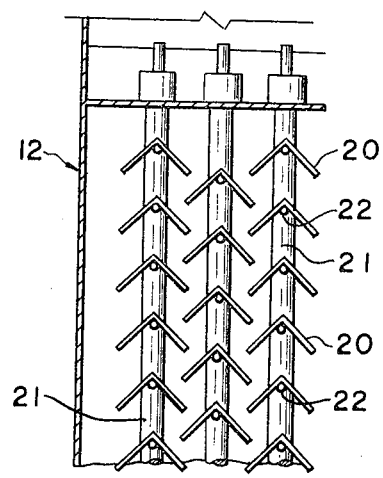
FIG. 3 is a sectional view taken along the line III—III.

The reaction chamber 12 is equipped with plate-like packings which promote an effective reaction between the oxides of sulfur in the waste gas with the particles of the alkaline sodium compounds. The shape and arrangement of the packings in the chamber are selected so that the particles of the sodium compound initially impinge upon the packings and then gradually fall from the packings. Accordingly, the plate-like packings are slanted in the direction of the gas flow and are positioned at an angle across the gas flow in a parallel arrangement. One embodiment of desired shape and arrangement of the packings is shown in FIGS. 2 and 3. In FIGS. 2 and 3, the reference numeral 20 designates angle bars which are arranged in the reaction chamber 12 as a packing material. Each angle bars 20 has holes at both ends thereof. Stanchions 21 are vertically placed in the reaction chamber and pass through the holes at the ends of each angle bar 20. Each angle bar 20 is supported on stanchion 21 by a pin 22 which extends through the bend in each bar. Further, as shown in FIG. 3, angle bars are arranged in a zigzag arrangement and the arms of each angle bar partially overlaps the area above one of the arms of each angle bar immediately below it and on adjacent stanchions. As a consequence of this arrangement, all of the particles of the alkaline sodium compound fed to the reacton chamber with the waste gas impinge upon the angle bars. At the tops of the stanchions 21, means are provided for imparting a shock or vibration to the angle bars 20 in order to prevent an excessive build-up of deposits of particles of sodium compounds. The means by which a shock or vibration is imparted to angle bars consists of an arm 23 which is rotatably mounted on the top end of the stanchion 21. The other end of the arm 23 is connected to support means 25. A cam roller 26 is connected under the arm 23 in order to connect the projected portion of cam 26 with the projected portion 24 positioned on the lower edge of arm 23. In order to shock or vibrate the angle bars 20, arms 23 and the stanchions 21 are lifted by revolution of the cam roller 26 in the direction of the arrow. Sufficient vibration can be provided by placing the shocking mechanism or means on a pair of stanchions supporting the angle bars. The deposit of particles of the alkaline sodium compounds on the surface of each angle bar grow to a certain thickness and then gradually fall from the bars and are discharged together with the waste gas through the outlet of the reaction chamber as shown by the arrow line. The desirable thickness of the deposited particles range from 0.1 – 10 mm. The reaction of the oxides sulfur in the waste gas is accomplished satisfactorily accomplished when the thickness of the deposit is greater than 0.1 mm. If the thickness is greater than 10mm, the replacement of the deposited particles stops. This impedes the flow of gas and results in an increased loss and a decreased rate of desulfurization.

Figure 4:
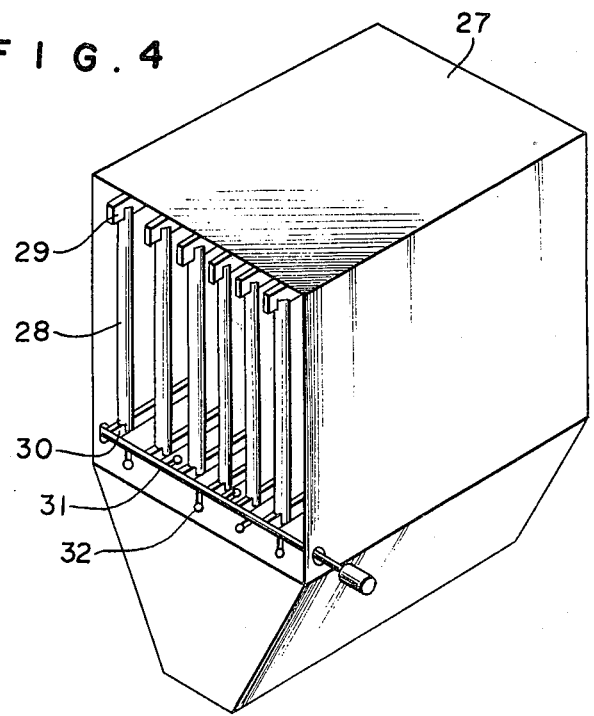
FIG. 4 is a schematic view of another embodiment of the reaction chamber.

In order to prevent excess deposition of the particles of the sodium compounds on the angle bars, the cam rollers 26 are rotated to supply the shocks necessary to remove the deposited particles. Preferably, the operation is periodically performed. If all of the angle bars arranged in a line vertical to the same pole are simultaneously vibrated the reaction efficiency is temporarily lowered. Accordingly, it is preferable to progressively vibrate one group of angel bars and then another group of angle bars and so on in order to minimize reaction efficiency. The vertical type reaction chamber is one embodiment of this procedure and has been illustrated. It is also possible to use a horizontal type reaction chamber as shown in FIG. 4, wherein the waste gas discharged from the cooling tower is fed to the reaction chamber in a horizontal direction. In FIG. 4, the reference numeral 27 designates a schematic reaction chamber. A plurality of vertical angle bars 28 are supported with upper stanchions 29 and lower stanchions 30 which are arranged parallel to each other. A plurality of angle bars 28 are arranged in a line along each pair of upper and lower stanchions at predetermined intervals. A rotatable shaft 31 is provided in the base of the chamber and is connected to one of the ends of each stanchion 30. A series of hammers 32 are positioned on shaft 31 which strike each lower stanchion 30 when shaft 31 is rotated. The angle bars 28 are struck when shaft 31 is rotated so that the particles of the sodium compounds which have been deposited on the angle bars are jarred loose and fall from the angle bars. In yet another embodiment of the reaction chamber, a series of long plates supported by upper and lower stanchions are shown in FIG. 4 which are slanted to the direction of gas flow can be provided instead of the angle bars.

The particles of the sodium compounds covered with sodium sulfate are fed together with the waste gas through the cooling tower to the reaction chamber having plate-like packings wherein the particles impinge on the angle bars and are crushed to fine particles. As the inner regions of the particles are exposed, they react with the oxides of sulfur in the waste gas.

The particles of the sodium compounds formed in the cooling tower are rough particles having particle diameters ranging from about 30 to 50 $\mu$. However, they can be crushed to fine particles with an average diameter of 0.5 – 1.0 $\mu$. The temperature of the waste gas in the reaction chamber is kept at 200° – 350° C, preferably 230° – 300° C, so that the $SO_2$ easily reacts oxidatively with sodium carbonate.

The conversion of the sodium hydroxide or sodium carbonate supplied to the cooling tower to sodium sulfate in the reaction chamber is controlled to be within the range of 60 – 85 wt.% preferably 75 – 85 wt.%. The gas discharged from the reaction chamber is fed to the dust collector 13 together with the entrained particles of dust, sodium sulfate and unreacted sodium carbonate.

Dust Collecting Step

In the dust collecting step, the dust particles which include particles of sodium compounds are removed from the gas discharged from the reaction chamber 12. The remaining oxides of sulfur, especially mists of sulfuric acid in the gas which are difficult to remove in the reaction chamber are removed. The reaction in the reaction chamber is controlled so that unreacted sodium carbonate remains in the gas discharged from the reaction chamber. The amount of unreacted sodium carbonate is in the range of 10 – 40 wt.%, preferably 15 – 25 wt.% based on the sodium hydroxide or sodium carbonate supplied to the cooling tower.

It is preferable to employ an electrostatic precipitator for the collection of particles. In this case, mists of sulfuric acid in the waste gas are attracted to the surface of the electrode or the immediate vicinity thereof where the mists contact the particles of sodium carbonate and are absorbed. Of course, most of the $SO_2$ which has remained in the gas reacts with sodium carbonate in the electric precipitator, and is removed. In that step, the temperature of the gas is in the range of 180° – 350° C, preferably 200° – 300° C.

In order to collect the dust, a filter type dust collector especially a bag filter is employed. Sodium carbonate remaining in the gas is deposited on the filter cloth, and the sulfuric acid mist and $SO_2$ are absorbed in it when the gas passes through the layer.

At the outlet of the reaction chamber, about 10 – 40 wt.% of the oxides of sulfur of the original amount of oxides of sulfur present in the initial waste gas remains. By passing the waste gas through the dust collecting step, more of the oxides of sulfur are removed so that about 80 – 90 wt %. of the original amount of oxides of sulfur present initially in the waste gas can be removed.

About 20 wt.% of the sulfuric acid mist generated is removed in the cooling tower an additional 50 – 70 wt.% of sulfuric acid mist compared to the original sulfuric acid content can be removed in the dust collecting step.

As already described in detail, the waste gas containing $SO_2$ in concentration of 500 – 1000 ppm, $SO_3$ in concentration of 40 – 100 ppm and dust in concentration of 0.1 – 0.5 g/$Nm^3$ which is discharged from glass melting furnaces can be desulfurized and have dust particles removed so that the concentration of $SO_2$, $SO_3$ and dust at the outlet of the dust collector are from 60 – 150 ppm, 3 – 10ppm and 0.01-g/$Nm^3$ respectively. The desulfurized and dust scrubbed gas in dust collector 13 is fed to stack 15 by fan 14 and is passed to the atmosphere. In addition, the dust which collects in the dust collector 13 and the dust which deposits at the bottom of the reaction chamber 12 are transferred to the dust tank 16. The dust consists of from 70 – 85 wt.% sodium sulfate, 5 – 25 wt.% sodium carbonate and a small amount of sodium sulfite and other impurities. The dust is fed to a purification step, wherein the dust is dissolved in water and then sulfuric acid is added to remove $SO_2$ and $CO_2$, sodium hydroxide is added to the solution to precipitate heavy metal ions as hydroxides thereof. After filtering the precipitate material, the filtrate is neutralized and sodium sulfate is crystallized from the filtrate and is recovered. Having generally described this invention, a further understanding can be obtained by reference to certain specific examples which are provided herein for purposes of illustration only and are not intended to be limiting unless otherwise specified.

EXAMPLE

The combustion waste gas from the flue of a glass melting furnace is characterized as follows:

| | | | |
|---|---|---|---|
| flow rate | 2000 Nm³/hr. | | |
| temperature | 400° C | | |
| Composition | | | |
| $O_2$ | 8.0 | vol. % | |
| $CO_2$ | 8.0 | " | |
| $H_2O$ | 10.0 | " | |
| $SO_2$ | 0.065 | " | (650ppm) |
| $SO_3$ | 0.005 | " | (50 ppm) |
| $N_2$ | balance | | |
| dust | 0.2 g/Nm³ | | |

The waste gas was fed through the lower region of a cooling tower where it contacted 4.5 wt.% of a sodium hydroxide solution countercurrently sprayed from nozzles in the upper regions of the tower. The feed rate of the sodium hydroxide solution was 105 l/hr. In the cooling tower, particles of a mixture of sodium compounds consisting essentially of sodium carbonate having an average diameter of 20 $\mu$, were produced. At the outlet of the cooling tower the temperature of the waste gas was 240° C, and the concentration of oxides of sulfur ($SO_2$ and $SO_3$) in the waste gas was 410 ppm. After completion of this step, the extend of desulfurization was 41%. The particles of the sodium compounds obtained at the outlet of the cooling tower consisted of sodium hydroxide and sodium carbonate. The degree of conversion of NaOH to $Na_2SO_4$ was 40 wt.%.

The waste gas discharged from the cooling tower was fed together with the particles of mixed sodium compounds to the reaction chamber shown in FIGS. 2 and 3. The reaction chamber has a length of 0.5m, a width of 1.5 m and a height of 3m, and contained 33 angle bars consisting of plates having a length of 1.5 m and a width of 5 cm which were arranged to leave vertical spaces of 9 cm from the top of the chamber to the edge of each plate and from the bottom of the chamber to the edge of each plate. Nine lines of angle bars were also arranged horizontally in the chamber spaced at distances of 5 cm. from each other.

The particles of the sodium compounds fed together with the waste gas to the reaction chamber impinged on the angle bars which generated fine particles having an average diameter of 0.7 $\mu$. The particles deposited on the surfaces of the angle bars to an average depth of about 2 mm. After 2 days of operation, the pressure loss was about only 70 mm Aq. At the outlet of the reaction chamber, the temperature of the waste gas was 210° C and the gas contained 165 ppm $SO_2$ and 10 ppm $SO_3$. The extent of desulfurization was 75% while the degree of conversion was 73%. After 4 days of operation, pressure loss in the reaction chamber reached 85 mm Aq. The thickness of the particle layers deposited on the angle bars decreased to less than 1 mm when each line of angle bars was progressively vibrated by the rotating action of a 2.5 cm cam roller. This operation was continued during the above treatment and thereafter. The waste gas was fed together with the particles of mixed sodium compounds to an electrostatic precipitator. At the outlet of the electrostatic precipitator, the waste gas contained 105 ppm of $SO_2$ 4 ppm of $SO_3$ and 0.01 g/Nm³ of dust. The degree of desulfurization was 83%. The treated waste gas was passed from the stack to the atmosphere. No white smoke was observed. The collected dust was dissolved in water and sulfuric acid was added to the aqueous solution to adjust the pH to 6 and to remove $SO_2$ and $CO_2$. Then, sodium hydroxide was added to the solution and the pH was adjusted to 10 to precipitate heavy metal ions as hydroxides thereof. Finally, the solution was neutralized to precipitate and to recover sodium sulfate.

Having now fully described the invention, it will be apparent to one of ordinarly skill in the art that many changes and modifications can be made thereto without departing from the spirit scope of the invention as ser forth herein.

What is claimed as new and desired to be secured by Letters Patent of the United States is:

1. A process for the recovery of oxides of sulfur from oxygen containing combustion waste gases, which comprises:
    cooling said waste gases having an initial temperature of 400° – 600° C and forming entrained articles of sodium compounds consisting essentially of sodium carbonate, by spray contacting said waste gases with a solution of sodium hydroxide or sodium carbonate, wherein the ratio of said sodium hydroxide or sodium carbonate to said oxides of sulfur is 0.9 to 1.5;
    converting sodium carbonate in the particles to sodium sulfate by passing said waste gases containing said oxides of sulfur and said sodium compound particles over plate-like packings, whereby said particles are comminuted to a finer particle size form, so as to enhance the reaction of said particles with the oxides of sulfur in said waste gases; and
    collecting entrained particles after said conversion step in a dust collector.

2. The process according to claim 1, wherein in said cooling step the concentration of sodium hydroxide or sodium carbonate in the sprayed solution is in the range of 1 – 20 wt.% which maintains an equivalency of sodium hydroxide or sodium carbonate in the range of 0.9 – 1.5 compared to the content of oxides of sulfur present in the waste gas.

3. The process according to claim 1, wherein in the cooling step the waste gas is cooled to 200° – 350° C.

4. The process according to claim 1, wherein the spray nozzle is cooled below the dew point of the surrounding atmosphere.

5. The process according to claim 1, wherein a plurality of said reaction chamber contains plate-like packings which are slanted with respect to the direction of gas flow.

6. The process according to claim 5, wherein in the reaction step the sodium compounds particles impinge upon the plate-like packings in the reaction chamber which forms fine particles having an average diameter of 0.5 – 1 $\mu$.

7. The process according to claim 1, wherein in the reaction step, the waste gas is maintained at a temperature from 200° – 350° C.

8. The process according to claim 1, wherein in the dust collecting step the mist of sulfuric acid remaining in the reacted waste gas is removed by contact with sodium carbonate.

* * * * *